(12) United States Patent
Kularatna et al.

(10) Patent No.: US 9,466,977 B2
(45) Date of Patent: Oct. 11, 2016

(54) POWER AND TELECOMMUNICATIONS SURGE PROTECTION APPARATUS

(71) Applicant: Waikatolink Limited, Hamilton (NZ)

(72) Inventors: Alythwela Domingo Vithanaye Nihal Kularatna, Hamilton (NZ); Lewis Hennedige Jayathu Dimuthu Kumara Fernando, Hamilton (NZ)

(73) Assignee: WAIKATOLINK LIMITED, Hamilton (NZ)

( * ) Notice: Subject to any disclaimer, the term of this patent is extended or adjusted under 35 U.S.C. 154(b) by 217 days.

(21) Appl. No.: 14/362,255

(22) PCT Filed: Dec. 11, 2012

(86) PCT No.: PCT/NZ2012/000232
§ 371 (c)(1),
(2) Date: Jun. 2, 2014

(87) PCT Pub. No.: WO2014/007647
PCT Pub. Date: Jan. 9, 2014

(65) Prior Publication Data
US 2014/0340807 A1 Nov. 20, 2014

(30) Foreign Application Priority Data
Dec. 12, 2011 (NZ) .................. 597021

(51) Int. Cl.
*H02H 9/02* (2006.01)
*H02H 9/00* (2006.01)
*B65D 13/00* (2006.01)
*C08J 3/24* (2006.01)
(Continued)

(52) U.S. Cl.
CPC .............. *H02H 9/005* (2013.01); *B65D 13/00* (2013.01); *C08J 3/24* (2013.01); *C08L 71/00* (2013.01); *H02H 9/04* (2013.01)

(58) Field of Classification Search
USPC ........................................... 361/118
See application file for complete search history.

(56) References Cited

U.S. PATENT DOCUMENTS 3,364,415 A * 1/1968 Hasley ............... H03K 3/45
331/165
3,401,304 A * 9/1968 Woodworth ............ H02H 7/05
361/17
(Continued)

FOREIGN PATENT DOCUMENTS

JP 2009-195033 8/2009
WO WO01/84574 11/2001
(Continued)

OTHER PUBLICATIONS

International Search Report, PCT/NZ2012/000232, May 21, 2013.
(Continued)

*Primary Examiner* — Ronald W Leja
(74) *Attorney, Agent, or Firm* — Young & Thompson (57) ABSTRACT

The invention provides a power surge protection apparatus which includes at least one large capacitor used within a surge protection circuit associated with an electrical load to be protected. This large capacitor or capacitors are arranged to divert and store at least a portion of the energy present in a transient voltage surge to prevent or mitigate damage to the protected electrical load. In preferred embodiments the invention uses large capacitors in the form of electrical double layer capacitors.

11 Claims, 5 Drawing Sheets

(51) Int. Cl.
*C08L 71/00* (2006.01)
*H02H 9/04* (2006.01)

(56) References Cited

U.S. PATENT DOCUMENTS

| | | | | |
|---|---|---|---|---|
| 3,484,623 A * | 12/1969 | Cain | ............... | G05F 1/445 |
| | | | | 327/456 |
| 4,107,579 A * | 8/1978 | Bodine, Jr. | ......... | H05B 41/042 |
| | | | | 315/205 |
| 4,350,930 A * | 9/1982 | Peil | ............... | H05B 35/00 |
| | | | | 315/178 |
| 4,521,822 A | 6/1985 | Simard | | |
| 4,878,145 A | 10/1989 | Lace | | |
| 5,398,150 A | 3/1995 | Standler | | |
| 5,555,150 A * | 9/1996 | Newman, Jr. | ............ | H02H 9/06 |
| | | | | 361/56 |
| 5,721,661 A | 2/1998 | Mechanic | | |
| 6,624,997 B1 * | 9/2003 | Llanos | ............... | H01F 27/343 |
| | | | | 307/105 |
| 2003/0086234 A1 * | 5/2003 | Harford | ............... | H02H 9/005 |
| | | | | 361/113 |
| 2006/0152334 A1 * | 7/2006 | Maercklein | ............ | H01C 7/003 |
| | | | | 338/210 |
| 2009/0021881 A1 * | 1/2009 | Crevenat | ............... | H02H 9/06 |
| | | | | 361/111 |
| 2011/0164339 A1 | 7/2011 | Schmid et al. | | |
| 2011/0286134 A1 | 11/2011 | Zylstra et al. | | |
| 2014/0340807 A1 * | 11/2014 | Kularatna | ............... | C08L 71/02 |
| | | | | 361/118 |
| 2015/0055260 A1 * | 2/2015 | Tekletsadik | ............ | H02H 9/005 |
| | | | | 361/79 |
| 2015/0055263 A1 * | 2/2015 | Tekletsadik | ............ | H02H 9/021 |
| | | | | 361/93.6 |

FOREIGN PATENT DOCUMENTS

| | | |
|---|---|---|
| WO | WO02/061904 | 8/2002 |
| WO | WO2005/062884 | 7/2005 |

OTHER PUBLICATIONS

Kularatna, N. et al., "Surge Endurance Capability Testing of Supercapacitor Families", IECON 2010—36th Annual Conference on IEEE Industrial Electronics Society, Nov. 7-10, 2010, [Retrieved on May 9, 2013], Retrieved from the Internet, <URL:http://ninfa.inf.ufes.br/public_files/thomas/iecon10-icelie10-proceedings/iecon10/docs/1852-gf-003786.pdf> pp. 1852-1857(Abstract Only).

Kozhiparambil, P.K., Development of a Supercapacitor based Surge Resistant Uninterruptible Power Supply, Mar. 17, 2011 [Retrieved on May 9, 2013], Retrieved from the Internet, <URL:http://researchcommons.waikato.ac.nz/bitstream/handle/10289/5360/thesis.pdf> Section 4.1-4.3, 6.1; Fig 4.1.

Madawala et al., "An ICPT-Supercapacitor Hybrid System for Surge-Free Power Transfer"—IEEE Transactions on Industrial Electronics, vol. 54, No. 6, Dec. 2007.

Australian Office Action dated Apr. 1, 2016 in corresponding Australian Patent Application No. 2012384601.

* cited by examiner

POWER AND TELECOMMUNICATIONS SURGE PROTECTION APPARATUS

TECHNICAL FIELD

This invention relates to a power surge protection apparatus which may be used to protect electrical loads from transient overvoltage conditions. In preferred embodiments the invention may be used to protect electrical loads from transient electrical disturbances on low voltage AC supply lines.

BACKGROUND ART

Quality of supply is an important factor for electrical energy consumers. High voltage, high energy transient power spikes delivered along or through power supply systems can cause significant damage to electrical loads. In particular these forms of transient surges can cause significant damage to sensitive semiconductor components commonly found in domestic, industrial and commercial electronic systems.

These transient surges are characterised by high energy and high voltage but have a very short duration. A number of techniques and components have been developed to mitigate the effects of these surges, and preferably to absorb or deflect the energy they contain prior to it reaching an electrical load. Lightning strikes and inductive power dumps are the most common source of electrical transients, the occurrence of which cannot be predicted and which can deliver transient surges capable of effectively destroying a wide range of electrical loads.

In addition to surge protection switching gear deployed with a high voltage power transmission networks a number of surge protection devices have been developed for use in proximity to electrical loads or to be combined with the electrical loads itself. These localised surge protectors can—for example—be found in power supply the systems of an electrical load or in power boards or multi plug products advertised to consumers as providing some form of surge protection. These localized forms of surge protector generally incorporate some form of non-linear componentry with filters which act to provide a path to ground for electrical transients above a specific break down voltage. Examples of these devices can include gas discharge tubes, metal oxide varistors, or semiconductor devices such as breakdown diodes or thyristors which are all commonly known as transient voltage suppressor (TVS) components.

These existing types of non-linear surge protection devices can however experience gradual degradation in their performance over time. With exposure to multiple surges the break down or triggering voltage of some of these components can be lowered by each successive surge, ultimately leading to the surge protector effectively preforming as a short circuit to ground and preventing any power being supplied to a load, or acting as an ineffective unit without any protection being provided.

Another characteristic of these types of non-linear TVS components is the response time that they take prior to channelling a transient away from an electrical load. Due to the short duration and high energy characteristic of such transients it is preferable that these surge protection components act as rapidly as possible to prevent as much of the transient surge reaching a load as possible.

In practice a combination of several different types of TVS components may be employed with each component selected based on its rated response and performance characteristics.

Storage capacitors have been considered for use in these surge protection applications but have been found to be unsuitable. Although standard capacitors are able to receive charging voltages of hundreds of volts their capacitance and associated time constants mean that they will receive more than a full charge generally within the period of the transient. Although standard capacitors are readily available and inexpensive components they are unable to cope with the relatively high energy content of transients and will quickly become over charged and damaged.

A relatively new class or form of large capacitor known as a supercapacitor, electric double layer ("EDL") capacitor, or ultra-capacitor also exists. These devices can exhibit significantly higher capacitances than commonly found versions of standard capacitors such as electrolytic, ceramic, or tantalum capacitors. These EDL capacitors can also have associated time constants or charging times which are significantly longer than such standard capacitors.

However, current commercial families of EDL capacitors are unable to receive high continuous charging voltages and are usually only rated to receive charging voltages of less than approximately 5 volts (DC). Due to these low continuous DC voltage ratings EDL capacitors are generally not considered in high energy surge protection applications.

It would therefore be of advantage to have a further class of TVS type components available to supplement or potential replace existing forms of TVS components. In particular it would be of advantage to have an improved power surge protection apparatus which could improve on the performance of prior art systems or at least allow the implementation of a protection apparatus with an improved response time and/or reliability. Any improvements which could be made in the field of transient voltage suppression which address any of the above issues or at least provide an alternative choice to the prior art would also be of advantage.

DISCLOSURE OF INVENTION

According to one aspect of the invention there is provided a power surge protection apparatus which includes at least one large capacitor used within a surge protection circuit associated with an electrical load to be protected, said large capacitor being adapted to divert and store at least a portion of the energy present in a transient voltage surge to prevent or mitigate damage to said electrical load.

Preferably the large capacitor provided is also arranged to dissipate at least a portion of the energy present in a transient voltage surge.

According to a further aspect of the present invention there is provided a power surge protection apparatus substantially as described above wherein said at least one large capacitor is provided in combination with at least one non-linear element.

According to a further aspect of the present invention there is provided a power surge protection apparatus substantially as described above wherein said at least one large capacitor is connected with at least one non-linear element, the connection of the capacitor with said at least one non-linear element allowing charging of the capacitor when the non-linear element activates.

According to a further aspect of the present invention there is provided a power surge protection apparatus substantially as described above where said at least one large capacitor is connected in series with at least one non-linear element.

According to yet another aspect of the present invention there is provided a power surge protection apparatus substantially as described above which includes at least one magnetic component combined with a large capacitor, said at least one magnetic component having at least three terminals, whereby the connection of said at least one magnetic component provides a static voltage difference across the large capacitor.

According to yet another aspect of the present invention there is provided a power surge protection apparatus substantially as described above which includes a large capacitor connected across two terminals of the magnetic component, whereby the connection of the large capacitor across two terminals of said at least one magnetic component provides a static voltage difference across the large capacitor.

According to a further aspect of the present invention there is provided a power surge protection apparatus substantially as described above wherein a magnetic component is provided by a multi-winding transformer where a large capacitor or multiple large capacitors are connected across the terminals of any two windings of said transformer and the turns ratios of the transformer windings are configured to provide the static voltage difference across the large capacitor or capacitors.

According to yet another aspect of the invention there is provided a power surge protection apparatus which includes at least one large capacitor used within a surge protection circuit associated with an electrical load to be protected, said large capacitor being adapted to divert and store at least a portion of the energy present in a transient voltage surge to prevent or mitigate damage to said electrical load, and at least one non-linear element connected in combination with said at least one large capacitor, and at least one magnetic component connected in combination with said at least one large capacitor, said at least one magnetic component having three or more terminals, whereby the connection of said at least one magnetic component provides a static voltage difference across the large capacitor.

According to yet another aspect of the invention there is provided a power surge protection apparatus which includes at least one large capacitor used within a surge protection circuit associated with an electrical load to be protected, said large capacitor being adapted to divert and store at least a portion of the energy present in a transient voltage surge to prevent or mitigate damage to said electrical load, and at least one non-linear element connected with said at least one large capacitor, the connection of the large capacitor with said at least one non-linear element allowing charging of the large capacitor when the non-linear element activates, and at least one magnetic component, said magnetic component having three or more terminals, said at least one capacitor being connected across two terminals of the magnetic component, whereby the connection of said at least one magnetic component provides a static voltage difference across the large capacitor.

According to a further another aspect of the invention there is provided a power surge protection apparatus which includes at least one large capacitor used within a surge protection circuit associated with an electrical load to be protected, said large capacitor being adapted to divert and store at least a portion of the energy present in a transient voltage surge to prevent or mitigate damage to said electrical load, and at least one non-linear element combined with said at least one large capacitor, and at least one transformer, wherein said at least one large capacitor is connected across the terminals of the windings of said at least one transformer.

According to a further another aspect of the invention there is provided a power surge protection apparatus which includes at least one large capacitor used within a surge protection circuit associated with an electrical load to be protected, said large capacitor being adapted to divert and store at least a portion of the energy present in a transient voltage surge to prevent or mitigate damage to said electrical load, and at least one non-linear element connected with said at least one large capacitor, the connection of the large capacitor with said at least one non-linear element allowing charging of the large capacitor when the non-linear element activates, and at least one transformer, wherein said at least one large capacitor is connected across the terminals of the primary and secondary windings of said at least one transformer.

The present invention is adapted to provide an enhanced power surge protection apparatus. This device is to be employed against the unwanted effects of transient voltage surges or pulses which can be experienced in power supply and telecommunications networks. These transient voltage surges or transients are characterised by a high voltage short duration signal which is capable of delivering significant energy to an electrical load over a short period of time. The present invention is adapted to provide a protection system for electrical loads in addition to telecommunications or data processing apparatus to prevent or at least mitigate any damage which could be caused to a load.

In a preferred embodiment the present invention may be employed in proximity to a load or a local power supply unit for an electrical load. For example in some instances the present invention may be integrated with circuitry for a power board, printed circuit board or multi plug system which offers surge protection capabilities for any electrical load subsequently plugged into the board. In other embodiments the invention may be integrated into power supply or control componentry of an electrical load itself ensuring that the load or componentry will be provided with a degree of protection against transient surges—irrespective of its connection scheme to a power supply network or part of a telecommunication or data network.

Reference in general will also be made to the present invention being employed in proximity to a load and in particular being used to protect loads normally supplied at relatively low voltage mains power instead of within high voltage power transmission networks. Again, those skilled in the art should however appreciate that the present invention may also be applied in high voltage power transmission applications or in parts of telecommunications or data networks if required.

Reference in general will also be made to the present invention being employed in a protection scheme where at least two wires are present. However those skilled in the art should appreciate that a variety of circuit arrangements and configurations may employ the invention to guard against either or both common mode and/or differential mode surges.

Reference to the use of the invention in the protection of a single mode or where two wires are present should not be seen as limiting. Those skilled in the art will appreciate that the present invention can be used equally well in common single phase power line situations such as with two wires with an earth terminal, and/or three phase supply situations with three or four wire transmissions systems are used.

The present invention employs at least one large capacitor to divert and store at least a portion of the energy present in a transient surge. A large capacitor used in this role may not necessarily divert all the energy present within a transient surge but can act to lessen the full effect of the transient to substantially mitigate the effect of the transient and reduce the chances of the load being damaged.

In a number of embodiments of the invention a large capacitor is expected to have a capacitance value adequate enough to absorb and maintain its integrity while absorbing the full or part of the transient energy within the superimposed surge, together with a relatively large time constant. This time constant should be very much larger than the transient duration, and in preferred embodiments may be several orders of magnitude larger than the anticipated transient duration. Any appropriate arrangement of a capacitor which may has these technical capabilities can be used as a large capacitor in accordance with the invention.

In a preferred embodiment a large capacitor employed by the invention may be formed by an electrical double layer capacitor. These EDL or electrical double layer capacitors are also known as super capacitor or ultra-capacitors.

EDL capacitors have a high capacitance giving these components high relative time constants and long charging periods. The time required to fully charge an EDL capacitor is in general much longer than the anticipated time period of transient surges to be protected against. Therefore supercapacitors have the capacity to divert and store a significant amount of the energy present within a transient surge and are very unlikely to experience damage through over charging when use in the invention as discussed further below. Due to the nature of their construction and size EDL capacitors have a relatively large continuous energy storage capacity when compared with the surge absorption capabilities of existing prior art surge protection components. This means that EDL capacitors can act to absorb or divert the energy present within a transient surge away from an electrical load prior to exposure of the load to the majority of the energy of the transient.

Reference throughout this specification will also be made to the invention employing large capacitors formed from or provided by EDL capacitors. However those skilled in the art will appreciate that the present invention may also be implemented through other forms of suitably large capacitors.

Preferably an EDL capacitor employed within the invention may be connected in association with at least one non-linear element. The connection of the large or EDL capacitor is arranged so that activation of the non-linear element allows charging of the large capacitor.

These forms of non-linear elements are well known in the field and selectively activate to provide a return path to transient surges only after a high break down voltage is experienced by the non-linear element. In this role the EDL capacitor provided implements a duel or additional protection scheme and has a combined improved effect in addition to the normal protection afforded by these forms of non-linear elements. Both the non-linear element and the EDL capacitor can work together to provide better protection than would normally be offered by the non-linear element in isolation. Furthermore, the combination of EDL capacitor with a non-linear element also ensures that during normal operating conditions unwanted charging of the EDL capacitor is avoided.

Those skilled in the art should appreciate that a wide range of different forms of known components may provide a non-linear element in conjunction with the present invention. For example metal oxide varistors (MOV), semiconductor devices such as break over diodes, thyristiors, and other equivalent components in addition to gas discharge tubes may be used in other instances. Those skilled in the art should appreciate that a wide range of different non-linear elements capable of selective activation and well known in TVS applications may be utilised in conjunction with the present invention.

Preferably the present invention employs at least one magnetic component combined with an EDL capacitor to control the voltage difference experienced by the EDL capacitor. Current designs of EDL capacitor are generally rated for the application of relatively low voltages only—being in the order of less than 10 Volts and usually between 2 to 6 volts DC. The magnetic component combined with an EDL capacitor provided by the present invention thereby protects the EDL capacitor from the application of unwanted high continuous charging voltages yet still allows the EDL capacitor and any associated components to preform effectively to divert, store and preferably dissipate energy from transient surges.

A magnetic component provided in accordance with the invention has at least three terminals. Preferably a magnetic component may be formed by any transformer like structure which defines two or more windings and a core where these windings interact with each other. For example, in one embodiment such a transformer like structure may be provided by a single winding inductor with a tap provided at one or more points along the length of this single winding. In other embodiments more traditional independent primary and secondary windings may alternatively be used.

Preferably the invention provides a large capacitor connected across two terminals of the magnetic component, whereby the connection of the large capacitor across two terminals of said at least one magnetic component provides a static voltage difference across the large capacitor.

Preferably the invention may provide a large capacitor connected across two terminals of a magnetic component, with a further third terminal of the magnetic component connected to a source of a transient voltage surge. In a further preferred embodiment a fourth or terminal of the magnetic component may also be connected to a source of a transient voltage surge.

Those skilled in the art will appreciate that references to the connection of a large capacitor across two terminals encompasses both the direct connection of the capacitor to these terminals, in addition to indirect connections facilitated by intervening components.

In one preferred embodiment a magnetic component may incorporate or be formed from a transformer defining a set of primary and secondary windings. The EDL capacitor may be connected across the terminals of the primary and secondary windings of this transformer with the ratio of primary to secondary windings being selected or configured to provide the EDL capacitor the safe static voltage difference which it is rated for. This approach can provide adequate safety to the EDL capacitor from both transient and regular AC operating voltages. In such embodiments the connections of the transformer can interpose the transformer between the supply line on which transient surges can be experienced and the EDL capacitor with a load to be protected.

This arrangement of the invention's conductive element also provides further operational advantages when a transient voltage surge is experienced. The connections made across both the primary and secondary windings of a transformer results in a circuit arrangement which induces an equivalent inverted polarity pulse to that of the transient pulse as seen across a load being protected. Although of a short lived duration, this induced inverted pulse acts to cancel out the initial highest energy component of a transient voltage pulse.

Those skilled in the art should appreciate that a wide variety of transformer configurations may be employed with the invention to provide the static voltage difference required across any EDL capacitor used while facilitating the diversion, storage and dissipation of energy of a transient surge. For example, any permutation or combination of the following transformer or magnetic component arrangements may be utilised in various example embodiments if required:

- A single winding inductor with one or more additional taps combined with suitably configured non-linear devices and EDL capacitors or any other large capacitors
- A two winding transformer with suitably configured non-linear devices and EDL capacitors or any other large capacitors
- A multi-winding transformer with suitably configured non-linear devices and EDL capacitors or any other large capacitors In a preferred embodiment a large (and preferably an EDL) capacitor may be deployed as part of a sub circuit with additional components. For example in further preferred embodiments a large capacitor sub circuit may be provided which incorporates both a large capacitor and additional passive components. This wave shaping capability of a large capacitor sub circuit can be used in various applications depending on the load to be protected. Furthermore, known wave shaping techniques may also be employed to reduce the initial peak voltage of a transient voltage surge.

Those skilled in the art will appreciate that various combinations of large capacitors, resistors and/or inductors may be deployed in a variety of arrangements between the input and output terminals of such a sub circuit.

The present invention may provide many potential advantages over the prior art.

Through its use of large (or preferably EDL) capacitors improvements can be provided in respect of the amount of energy which can be diverted from an electrical load when a transient surge is experienced on a power supply line. The present invention may be combined with existing surge protection componentry to improve the performance of same in terms of the transient overvoltage conditions which can be protected against and the response time of the surge protection implemented.

The present invention can allow for the use of EDL capacitors in a surge protection role, being an entirely new class of applications never envisaged previously for these components. Furthermore EDL capacitors when used in a surge protection application may exhibit a high degree of reliability and a long life span when compared with existing non-linear shunt devices currently employed in the field.

The present invention may provide an additional option in terms of designer choice for surge protection systems, providing a continuous method of energy absorption capacity over a long period of time as opposed to the transient absorption capabilities of non-linear devices available and used in the prior art.

BRIEF DESCRIPTION OF THE DRAWINGS

An example embodiment of the invention is now discussed with reference to the drawings in which.

BEST MODE FOR CARRYING OUT THE INVENTION

Figure 1A:
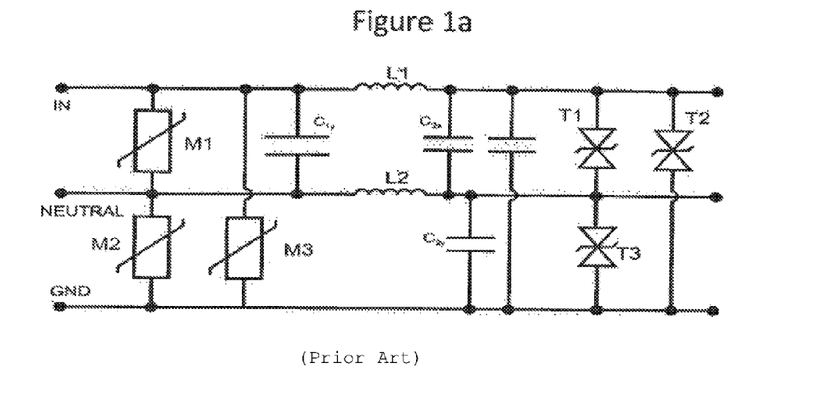
FIGS. 1a and 1b show a prior art circuit and simplified equivalent schematic diagram of a multi stage surge suppressor using a combination of prior art surge suppression components.
Figure 1B:
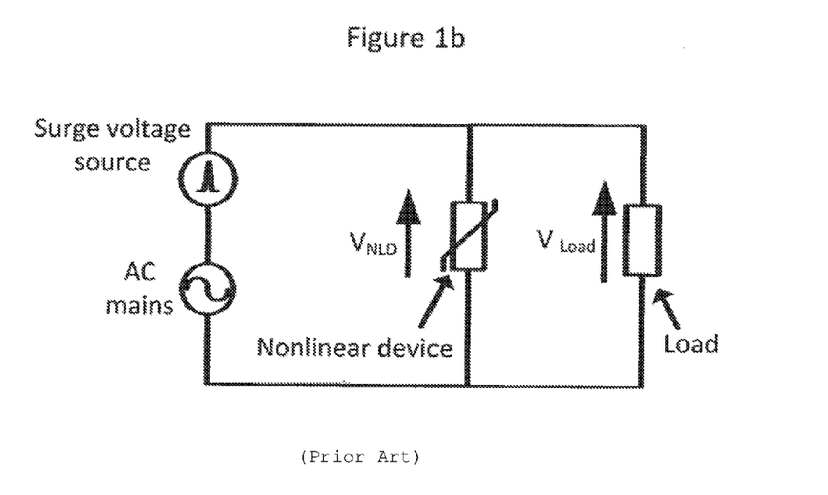

FIG. 1a shows a prior art circuit diagram implementing a multi stage surge suppressor using a combination of prior art surge suppression components. FIG. 1b shows an equivalent schematic diagram of this form of prior art circuit depicting the concept of a non-linear shunt element to protect the load, with this non-linear device connected in parallel to the load.

The circuit illustrated with respect to FIG. 1 employs metal oxide varistors (MOVs) M1 M2 M3 in combination TVS diodes T1 T2 T3 to guard against both common and differential mode transients.

As can be seen from the circuit illustrated with respect to FIG. 1 these prior art non-linear shunt elements operate when activated to divert damaging transient voltage surges from loads connected to the terminals of the circuit. Once a particular threshold break down voltage is experienced by these known TVS components they activate to provide a conductive path. In the implementation shown, the MOVs and TVS diodes work together to share the dispersal of transient energy, with the TVS diodes being used to shunt of any remaining energy not absorbed by the MOVs.

The circuit illustrated demonstrates how a variety of different surge protection components can be combined together to maximise the surge energy which can be absorbed prior to reaching a load. Each type of component in this circuit exhibits its own performance characteristics dependant on its inherent design and construction. In the embodiment shown over time and with exposure to a number of transient signals the performance of each of the MOV's and TVS diodes will eventually begin to degrade, ultimately resulting in failure of the surge protection circuit.

Figure 2:
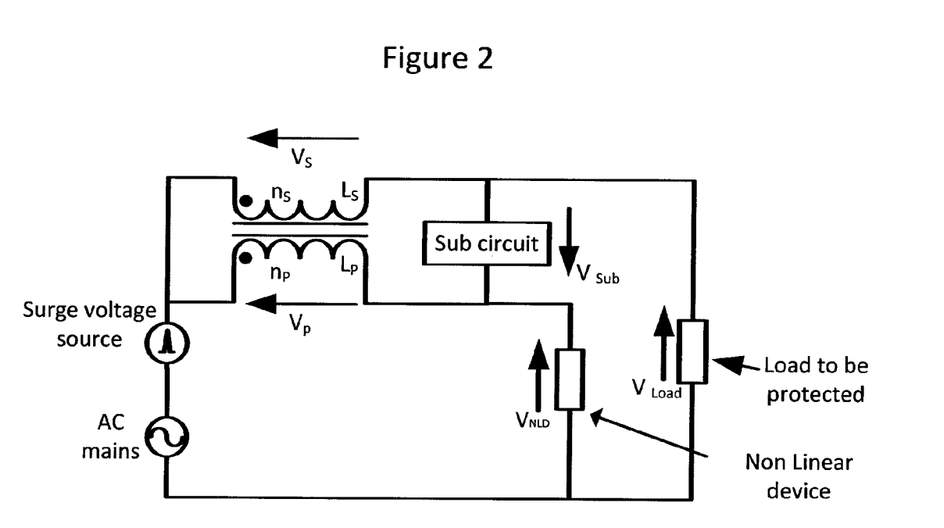
FIG. 2 shows a schematic circuit diagram of a power surge protection apparatus as provided in accordance with a preferred embodiment.

FIG. 2 shows a schematic circuit diagram of a power surge protection apparatus as provided in accordance with a preferred embodiment.

As can be seen from FIG. 2 this circuit integrates an EDL capacitor sub circuit—as indicated by the sub circuit component shown. The sub circuit includes an EDL capacitor in this embodiment, with FIGS. 4a-4d providing details on a number of possible implementations of sub circuit components and connections.

The EDL capacitor sub circuit used is connected in with a non-linear element—shown as component "NLD" which is formed in this embodiment by a TVS diode The circuit of FIG. 2 also illustrates an embodiment of the invention where the EDL capacitor is connected across a magnetic component to control the voltage experienced by the EDL capacitor. In the embodiment shown with respect to FIG. 2 this magnetic component is formed by a transformer primary and secondary winding applied over a suitable magnetic core such as a ferrite core. The EDL capacitor is connected across the terminals of the primary and secondary windings of this transformer, where the ratio of primary to secondary windings is selected and tuned to provide the EDL capacitor with the static voltage difference for which it is rated.

When the circuit of FIG. 2 experiences a transient surge of an abrupt appropriate high voltage the non-linear device—as provided in this embodiment by a TVS diode—activates and will begin to conduct and therefore provide a path for surge energy. The EDL capacitor sub circuit will then begin to charge with the intervention of the transformer controlling and fixing the maximum voltage applied across the terminals of the EDL capacitor sub circuit. The high capacitance of the EDL capacitor and its associated long time constant ensures that the capacitor is unlikely to become fully charged over the relatively short time period of the transient signal to be diverted.

As can be seen from the construction of the circuit shown with respect to FIG. 2 the majority of the energy present in a surge will be shunted away by the TVS diode. The EDL capacitor sub circuit acts as an assisting component storing any remaining surge energy not already shunted by the TVS diode and therefore preventing the load from experiencing damaging surge energy.

Figure 3A:
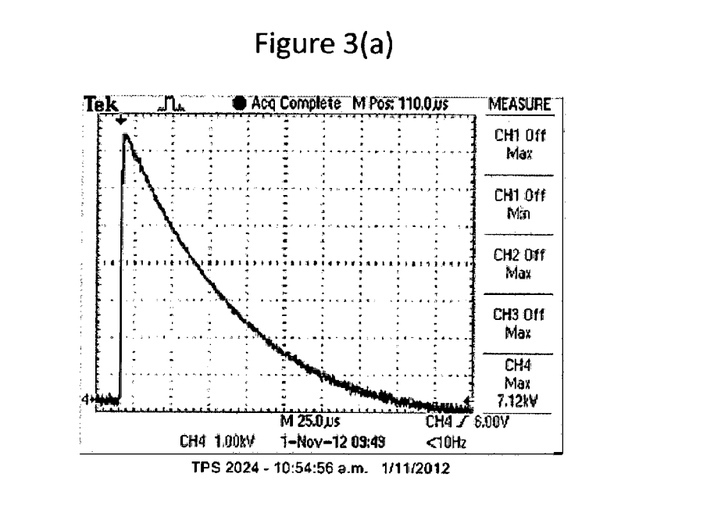
FIG. 3a illustrates a transient pulse test wave applied to the circuit of FIG. 2.
Figure 3B:
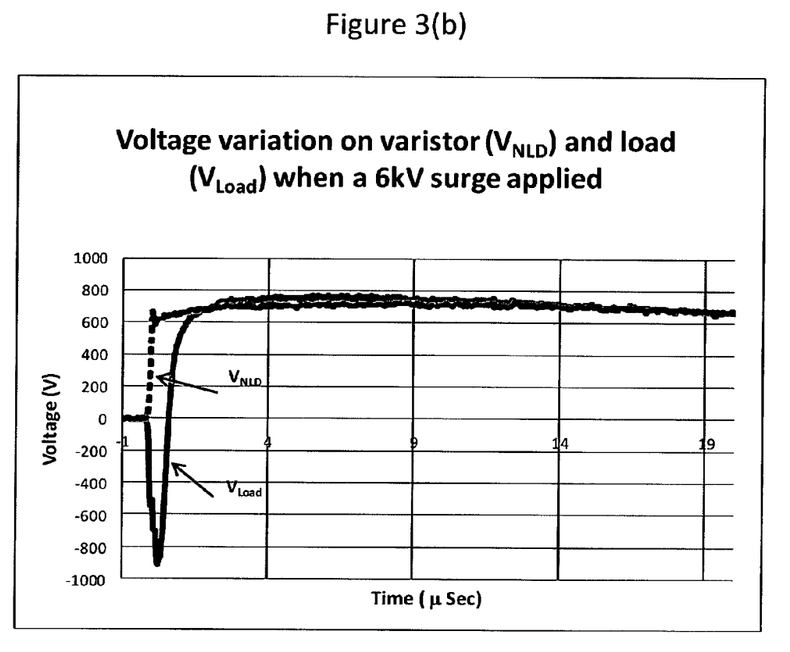
FIG. 3b illustrates a voltage versus time plot for both the nonlinear device and load of the circuit of FIG. 2 in the absence of the EDL capacitor sub circuit when the test pulse of FIG. 3a is applied.

FIG. 3a illustrates a transient test pulse as specified by test standards which is applied to the circuit of FIG. 2. FIG. 3b illustrates a Voltage vs. time plot for both the varistor and load of the circuit of FIG. 2 in the absence of the EDL capacitor sub circuit when the test pulse of FIG. 3a is applied.

The arrangement shown with respect to FIG. 3b illustrates how the test pulse shown with respect to FIG. 3a induces an equivalent inverted polarity pulse across a load being protected.

As can be seen from FIG. 3b this induced inverted pulse has a short duration but acts to cancel out the initial highest voltage transient component of a transient voltage pulse.

FIGS. 4a, 4b, 4c and 4d show a variety of possible implementations of the EDL capacitor sub circuit shown in respect of the circuit of FIG. 2.

Figure 4:
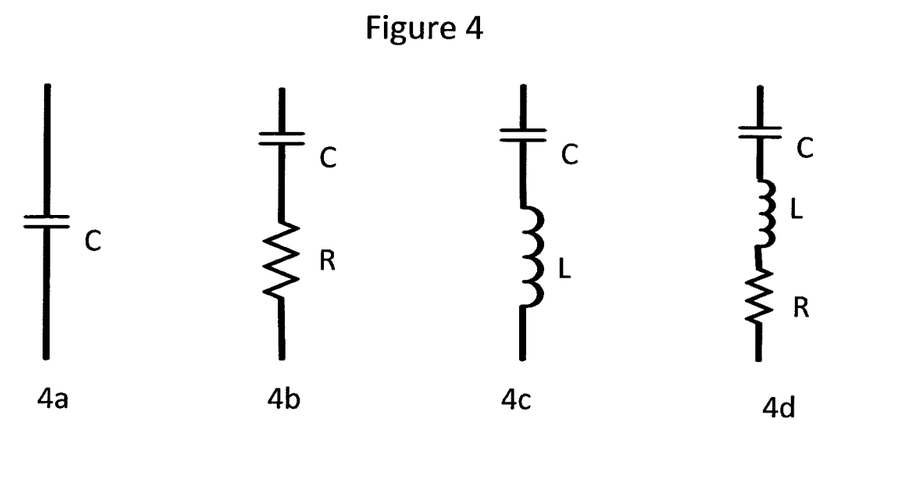
FIGS. 4a, 4b, 4c and 4d show a variety of possible implementations of the EDL capacitor sub circuit shown in respect of the circuit of FIG. 2.

This sub circuit can be provided in one embodiment with a single EDL capacitor, as shown with respect to FIG. 4a. Alternatively various combinations of additional resistors and inductors may be integrated within the sub circuit to provide a wave shaping or tuning facility, as illustrated in FIGS. 4b, 4c and 4d.

Figure 5A:
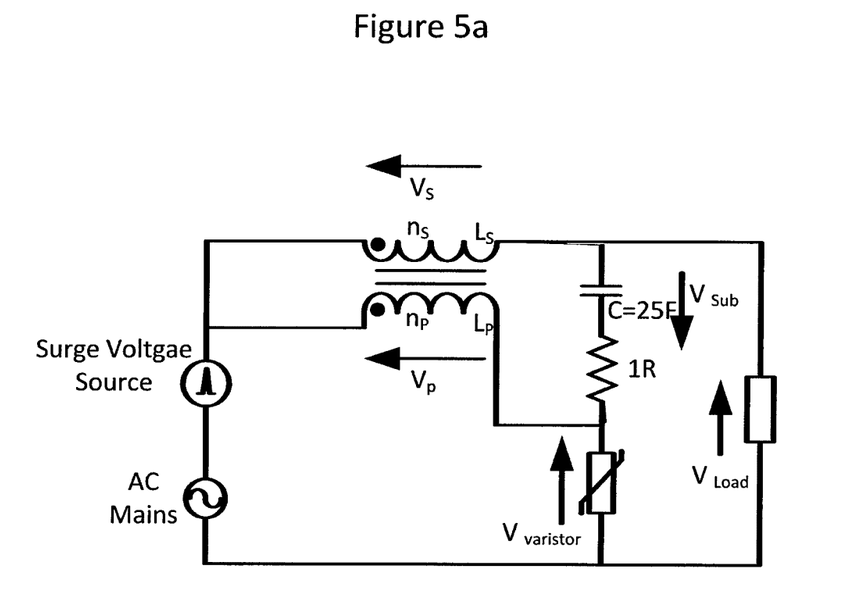
FIG. 5a shows a version of the circuit of FIG. 2 implemented with the EDL capacitor sub circuit of FIG. 4b.

FIG. 5a shows a version of the circuit of FIG. 2 implemented with the EDL capacitor sub circuit of FIG. 4b. In this example embodiment the sub-circuit includes a 1 ohm resistor and 25 Farad EDL capacitor. Those skilled in the art will appreciate that in other embodiments alternative resistance and capacitance values can be used.

Figure 5B:
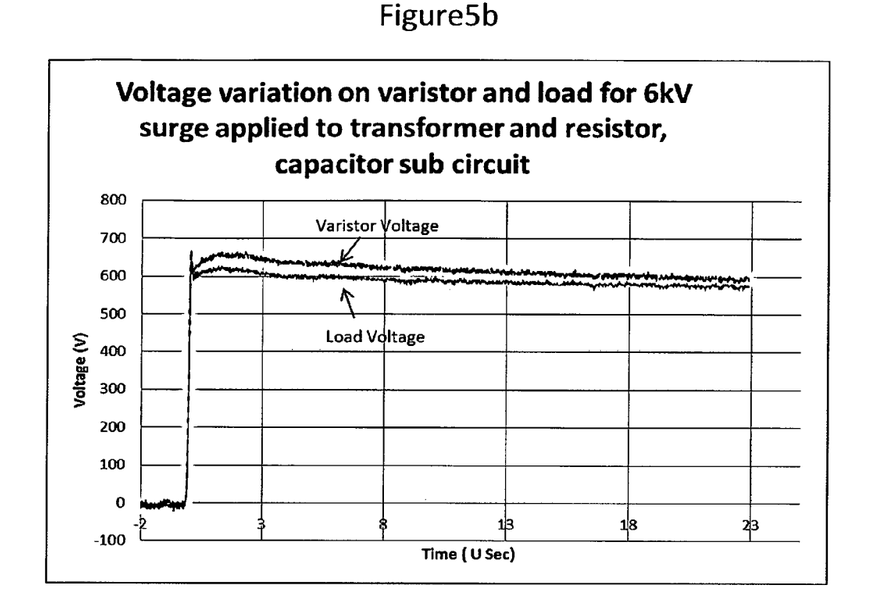
FIG. 5b shows a varistor and load voltage vs. time plot for the circuit of FIG. 5a when exposed to the test pulse of FIG. 3a, and FIG. 5c shows a plot of varistor and load voltage vs. increasing transient pulse voltages.
Figure 5C:
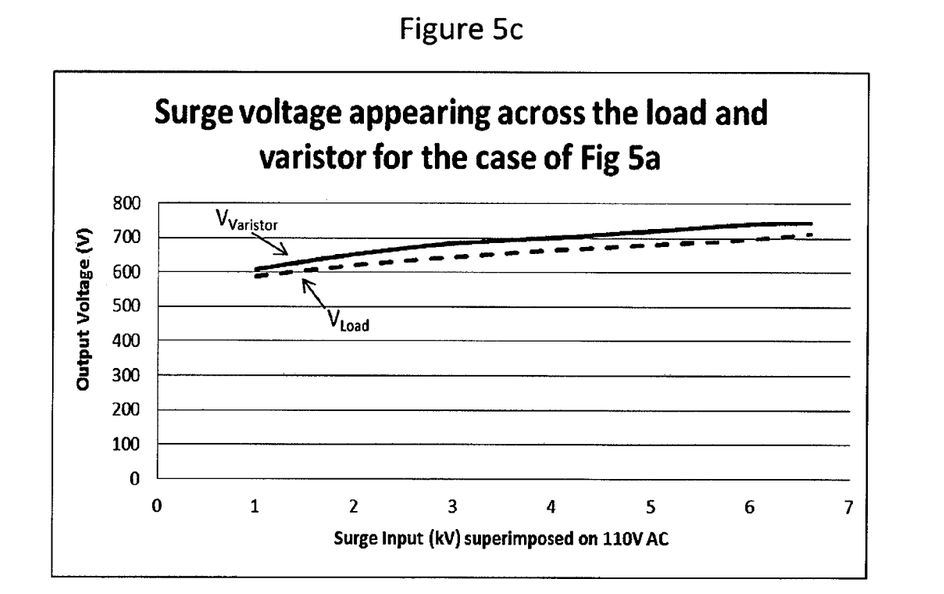

FIG. 5b shows a varistor and load voltage vs. time plot for the circuit of FIG. 5a when exposed to the test pulse of FIG. 3a. This plot indicates the instantaneous voltages appearing at the load and the nonlinear device, which is a metal oxide varistor (type Q20K275). In this embodiment the transformer has a turn ratio of 30:6 ($n_p$:$n_s$ at FIG. 5c shows a plot of varistor and load voltage vs. increasing transient pulse voltages. Table 1 shows in tabular form the data points plotted in respect of FIG. 5c.

TABLE 1

Output voltage for $n_p$:$n_S$, 30:6 turn ratio, type Q20K27S (from EPCOS) varistors (2 in parallel) and 25 F capacitor - 1Ω resistor sub circuit as shown in FIG. 5a

| Surge voltage superimposed on 110 V AC (kV) | Varistor voltage (V) | Load Voltage (V) |
|---|---|---|
| 1 | 608 | 588 |
| 2 | 652 | 620 |
| 3 | 684 | 644 |
| 4 | 700 | 664 |
| 5 | 720 | 680 |
| 6 | 740 | 696 |
| 6.6 | 744 | 712 |

As can clearly be seen from these figures the invention in this embodiment performs effectively to protect a load when exposed to multiple kilovolt transient surges. The voltage actually experienced at the load is also reduced when compared with that at the varistor, which is not the case with the prior art.

Those skilled in the art would readily appreciate how the example embodiment illustrated above may be modified to protect against either or both differential or common mode transients and potentially may be used in isolation or in combination with a range of prior art existing surge protection circuits and schemes in other embodiments. Modifications and variations of the example embodiment of the invention discussed above will be apparent to those skilled in the art and may be made without departure of the scope of the invention as defined in the appended claims.

What we claim is:

1. A power surge protection apparatus, comprising:
   at least one large capacitor used within a surge protection circuit associated with an electrical load to be protected, said large capacitor being configured to divert, dissipate, and store at least a portion of the energy present in a transient voltage surge to prevent or mitigate damage to said electrical load;
   at least one non-linear element connected with said at least one large capacitor, the connection of the large capacitor with said at least one non-linear element allowing charging of the large capacitor when the non-linear element activates; and
   at least one transformer, said at least one large capacitor is connected across terminals of the primary and secondary windings of said at least one transformer but not to the terminals which are connected together.

2. The power surge protection apparatus as claimed in claim 1, wherein the combination of the large capacitor and the non-linear element prevents charging of the large capacitor in the absence of a transient voltage surge.

3. The power surge protection apparatus as claimed in claim 1, wherein the non-linear element is formed by one or more of a metal oxide varistor, a break over diode, thyristor, and a gas discharge tube.

4. The power surge protection apparatus as claimed in claim 1, wherein the at least one transformer has at least three terminals, whereby the connection of said at least one transformer provides a static voltage difference across the large capacitor.

5. The power surge protection apparatus as claimed in claim 1, wherein the at least one transformer includes a multi-winding transformer.

6. The power surge protection apparatus as claimed in claim 1, wherein the at least one transformer includes a two-winding transformer.

7. The power surge protection apparatus as claimed in claim 1, wherein said transformer is interposed between a supply line on which transient surges are experienced and the large capacitor with a load to be protected.

8. The power surge protection apparatus as claimed in claim 1, wherein the large capacitor is connected across the primary and secondary windings of the transformer with the ratio of primary to secondary windings being configured to provide the large capacitor a static voltage difference for which the large capacitor is rated.

9. The power surge protection apparatus as claimed in claim 1, wherein the at least one large capacitor is provided by an electrical double layer capacitor.

10. The power surge protection apparatus as claimed in claim 1, wherein the power surge protection apparatus is integrated with circuitry for a power board, printed circuit board or multi-plug system to provide surge protection capabilities for any electrical load subsequently plugged into the board.

11. The power surge protection apparatus as claimed in claim 1, which is integrated into power supply or control componentry of an electrical load.

* * * * *

UNITED STATES PATENT AND TRADEMARK OFFICE
CERTIFICATE OF CORRECTION

PATENT NO. : 9,466,977 B2  
APPLICATION NO. : 14/362255  
DATED : October 11, 2016  
INVENTOR(S) : Kularatna et al.

Page 1 of 1

It is certified that error appears in the above-identified patent and that said Letters Patent is hereby corrected as shown below:

On the Title Page

Item (72):
"(72) Inventors: Alythwela Domingo Vithanaye Nihal Kularatna, Hamilton (NZ);"

Should be replaced with:
--(72) Inventors: Aluthwela Domingo Vithanage Nihal Kularatna, Hamilton (NZ);--.

Signed and Sealed this  
Nineteenth Day of June, 2018

Andrei Iancu  
*Director of the United States Patent and Trademark Office*